March 28, 1967 J. M. JONSSON 3,310,813
MOUNTING MEANS FOR SANITARY BIDET-ADAPTER FOR LAVATORIES
Filed June 15, 1964
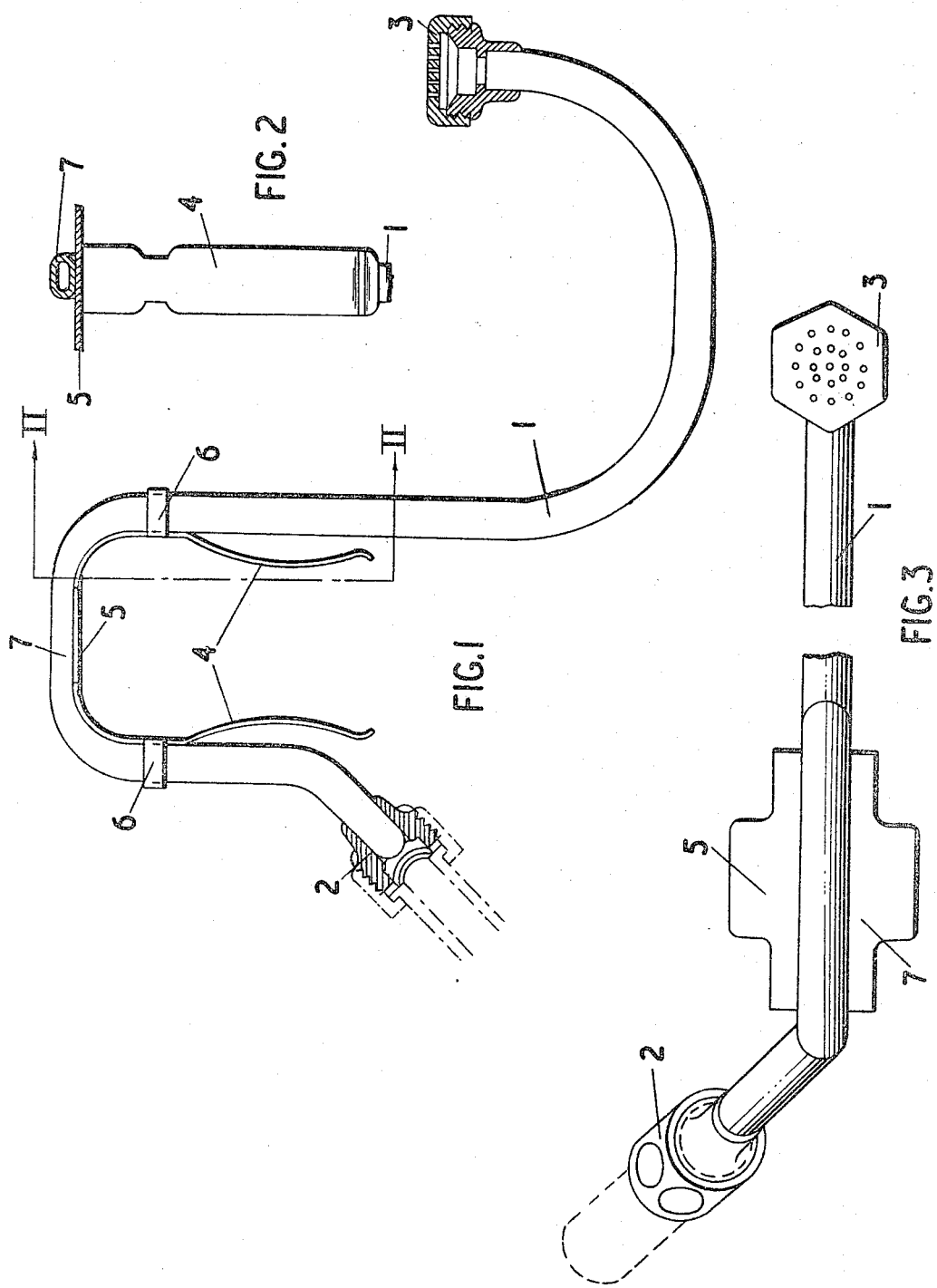

3,310,813
MOUNTING MEANS FOR SANITARY BIDET-
ADAPTER FOR LAVATORIES
Jon Martin Jonsson, Finspangsvagen 142,
Norrkoping, Sweden
Filed June 15, 1964, Ser. No. 375,083
Claims priority, application Sweden, Apr. 2, 1964,
4,037/64
5 Claims. (Cl. 4—7)

It is known that one can make lavatories fit for use also as bidets by introducing into them a detachable mainly S-shaped bent pipe one end of which is connected by means of a joint through a flexible tube to a mixing tap for hot and cold water and the other end of which is provided with a spray-nozzle which is so arranged that it will be positioned in the centre of, and below the seat opening when the U-shaped bent part of the pipe nearest to the flexible tube is brought over the edge of the lavatory and under the seat.

It has, however, proved difficult to get such a pipe to remain stationary in the desired position.

The present invention concerns a mounting device for such pipes, which makes it easy to introduce them in the desired position and which fixes them in that position.

The main feature of the mounting device according to the invention is that the two shanks of the part of the pipe which is bent into a U-shape over the edge of the lavatory bowl are provided with flat springs the ends of which are arranged so that they, when the pipe is introduced over the edge in question, lay resiliently against both sides of the edge.

A feature of the mounting device is also that the springs in question are fitted along these shanks of the pipe.

A further feature of the mounting device is that the part of the pipe bent into a U-shape which lays close to the upper side of the edge of the lavatory bowl is provided with a flat plate so arranged that it when laying against the upper side in question prevents the pipes from tilting sideways.

A further feature of the mounting device is that this plate and the flat springs are shaped into one piece and that the flat springs are provided with mounting brackets which are bent round the shanks of the pipe and keep the springs and pipe together.

It has also proved suitable to make the part of the pipe laying on top of the plate somewhat flattened so that it does not get jammed under the lavatory seat.

The invention is further explained in the drawings attached of which FIG. 1 shows one design of the mounting device according to the invention, viewed from the side, FIG. 2 shows a section along the line II—II in FIG. 1 and FIG. 3 shows the same design, viewed from the top.

A pipe 1 is bent mainly into an S-shape. One end of this is by means of a flexible tube 2 connected to a water tap, not shown, suitably a mixing tap for hot and cold water, and the other end of this is provided with a jet 3 suitably a spray-nozzle jet. The pipe 1 is bent and dimensioned in such a way that the jet 3, when the U-shaped part 7 of the pipe 1 next to the flexible tube 2 is introduced over the edge of a lavatory bowl, not shown, will be directed upwards towards the centre of the lavatory seat, not shown.

The pipe 1 is on both sides of its bent part 7 which is introduced across the edge of the lavatory bowl provided with a pair of flat springs 4 fitted along the U-shanks and these springs are somewhat bent towards the edge of the lavatory bowl and arranged so that they are laying against the inside and outside of the edge of the lavatory bowl and hold the pipe 1 resiliently in this position when the pipe 1 is fitted in the way stated above.

The flat springs 4 are connected to one another by means of a flat plate 5 fitted under the bent part 7 of the pipe, the flange being arranged so that it is laying against the upper side of the edge of the lavatory bowl, thus preventing the pipe 1 from tilting sideways.

The flat springs 4 are also provided with mounting brackets 6 which are bent round the shanks of the pipe and keep the springs 4 and the pipe 1 together.

The part 7 of pipe 1 which is laying on top of the plate 5 is suitably somewhat flattened so that it does not get jammed under the lavatory seat.

In spite of one design only being shown and described the invention includes also other possible designs.

I claim:

1. A detachable bidet-adapter for use with a lavatory bowl, comprising a substantially S shaped pipe, a portion of this pipe being substantially U-shaped and adapted to fit over the rim of a lavatory bowl, a spray nozzle attached to one end of the said pipe, a flexible tube attached to the other end of the pipe adjacent the portion of the pipe adapted to fit over the edge of the bowl, the tube being attachable to a water supply means, two leaf springs, attachment means for attaching each spring to each shank of the said U-shaped portion of the pipe, the said springs being adapted to grip the sides of the lavatory bowl when bidet-adapter is mounted on the bowl so that the spray nozzle is directed upwards within the bowl, and a flat plate, the plate being attached to the part of the pipe adapted to fit over the upper edge of the rim of the lavatory bowl.

2. A detachable bidet-adapter as claimed in claim 1, wherein the leaf springs and flat plate are formed in one piece.

3. A detachable bidet-adapter as claimed in claim 1, wherein the said attachment means comprise mounting brackets, one bracket provided on each spring and adapted to grip said shanks of said pipe.

4. A detachable bidet-adapter for use with a lavatory bowl, comprising a substantially S shaped pipe, a portion of this pipe being substantially U-shaped and adapted to fit over the rim of a lavatory bowl, a spray nozzle attached to one end of the said pipe, a flexible tube attached to the other end of the pipe adjacent the portion of the pipe adapted to fit over the edge of the bowl, the tube being attachable to a water supply means, two leaf springs, attachment means for attaching each spring to each shank of the said U-shaped portion of the pipe, the said springs being adapted to grip the sides of the lavatory bowl when a bidet-adapter is mounted on the bowl so that the spray nozzle is directed upwards within the bowl, and a flat plate, the plate being attached to the part of the pipe adapted to fit over the upper edge of the rim of the lavatory bowl, and the said part of the pipe being slightly flattened.

5. A detachable bidet-adapter as claimed in claim 4 wherein the leaf springs and flat plate are formed in one piece.

References Cited by the Examiner
UNITED STATES PATENTS

| | | | |
|---|---|---|---|
| 1,866,930 | 7/1932 | Guideth et al. | 4—7 |
| 2,504,257 | 4/1950 | Dunn | 4—7 |
| 2,705,495 | 4/1955 | Vrana et al. | 4—7 |
| 2,826,761 | 3/1958 | Lazarus et al. | 4—7 |
| 3,015,826 | 1/1962 | Aranas | 4—7 |
| 3,164,846 | 1/1965 | Foster | 4—7 |

LAVERNE D. GEIGER, Primary Examiner.

HENRY K. ARTIS, Assistant Examiner.